United States Patent
Parker (10) Patent No.: US 8,462,921 B2
(45) Date of Patent: Jun. 11, 2013

(54) EFFICIENCY REPORT INCORPORATING COMMUNICATION SWITCH STATISTICS

(75) Inventor: Jane Smith Parker, Douglasville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1088 days.

(21) Appl. No.: 11/946,400

(22) Filed: Nov. 28, 2007

(65) Prior Publication Data

US 2008/0069335 A1 Mar. 20, 2008

Related U.S. Application Data

(63) Continuation of application No. 11/314,045, filed on Dec. 20, 2005, now Pat. No. 7,369,654, which is a continuation of application No. 10/735,101, filed on Dec. 12, 2003, now Pat. No. 6,983,045.

(51) Int. Cl.
H04M 15/00 (2006.01)
G06Q 10/00 (2012.01)

(52) U.S. Cl.
USPC .............. 379/112.01; 705/7.11; 705/7.38

(58) Field of Classification Search
None
See application file for complete search history.

(56) References Cited

U.S. PATENT DOCUMENTS

| | | | |
|---|---|---|---|
| 6,377,567 B1 | 4/2002 | Leonard | |
| 6,480,597 B1 | 11/2002 | Kult et al. | |
| 6,490,350 B2 | 12/2002 | McDuff et al. | |
| 6,707,904 B1 * | 3/2004 | Judkins et al. | 379/265.06 |
| 6,868,154 B1 | 3/2005 | Stuart et al. | |
| 6,965,313 B1 | 11/2005 | Saylor et al. | |
| 6,970,829 B1 | 11/2005 | Leamon | |
| 6,983,045 B2 | 1/2006 | Parker | |
| 2001/0032120 A1 * | 10/2001 | Stuart et al. | 705/11 |
| 2002/0184069 A1 | 12/2002 | Kosiba et al. | |
| 2005/0129212 A1 | 6/2005 | Parker | |
| 2005/0129215 A1 | 6/2005 | Parker | |
| 2005/0131748 A1 | 6/2005 | Parker | |
| 2006/0098802 A1 | 5/2006 | Parker | |
| 2006/0140389 A1 | 6/2006 | Stuart et al. | |

OTHER PUBLICATIONS

Parker; Final Rejection mailed Jan. 25, 2008; U.S. Appl. No. 10/735,405, filed Dec. 12, 2003.
Parker; Advisory Action mailed Feb. 22, 2008; U.S. Appl. No. 10/735,099, filed Dec. 12, 2003.
Parker; Notice of Allowance and Fees Due mailed Mar. 5, 2008; U.S. Appl. No. 11/314,045, filed Dec. 20, 2005.

(Continued)

Primary Examiner — Paul Danneman
(74) Attorney, Agent, or Firm — Greenblum & Bernstein, P.L.C.

(57) ABSTRACT

Systems and methods for generating an efficiency report, which in one embodiment among many, can be broadly summarized by a representative method of obtaining a set of switching statistics from a database of a communication switch and integrating this set of switching statistics with a set of work statistics of an operator to generate an efficiency report. Another embodiment can be described as an efficiency report generator that has logic configured to receive an operator work statistic that has been generated in a first computing element using a first entry code, to translate the first entry code into a second entry code, to use this second entry code to store the operator work statistic together with a call statistic received from a communication switch, in a database of the efficiency report generator, and to process these statistics to generate an efficiency report.

20 Claims, 8 Drawing Sheets

OTHER PUBLICATIONS

Parker; Notice of Allowance and Fees Due mailed Dec. 26, 2007; U.S. Appl. No. 11/314,045, filed Dec. 20, 2005.
Parker; U.S. Appl. No. 10/735,405, filed Dec. 12, 2003.
Parker; U.S. Appl. No. 10/735,101, filed Dec. 12, 2003.
Parker; U.S. Appl. No. 11/314,045, filed Dec. 20, 2005.
Parker; U.S. Appl. No. 10/735,099, filed Dec. 12, 2003.
Parker; U.S. Appl. No. 10/735,407, filed Dec. 12, 2003.
Parker; Advisory Action mailed May 29, 2008 for U.S. Appl. No. 10/735,405, filed Dec. 12, 2003.
Parker; Non-Final Rejection mailed Sep. 21, 2007 for U.S. Appl. No. 10/735,405, filed Dec. 12, 2003.
Parker; Pre-Brief Appeal Conference Decision mailed Aug. 5, 2008 for U.S. Appl. No. 10/735,405, filed Dec. 12, 2003.
Parker; Non-Final Rejection mailed Jul. 14, 2005 for U.S. Appl. No. 10/735,101, filed Dec. 12, 2003.
Parker; Notice of Allowance mailed Sep. 30, 2005 for U.S. Appl. No. 10/735,101, filed Dec. 12, 2003.
Parker; Final Rejection mailed Jun. 20, 2007 for U.S. Appl. No. 11/314,045, filed Dec. 20, 2005.
Parker; Non-Final Rejection mailed Jan. 16, 2007 for U.S. Appl. No. 11/314,045, filed Dec. 20, 2005.
Parker; Non-Final Rejection mailed Aug. 31, 2007 for U.S. Appl. No. 11/314,045, filed Dec. 20, 2005.
Parker; Final Rejection mailed Oct. 1, 2007 for U.S. Appl. No. 10/735,099, filed Dec. 12, 2003.
Parker; Non-Final Rejection mailed Apr. 6, 2007 for U.S. Appl. No. 10/735,099, filed Dec. 12, 2003.
Parker; Advisory Action mailed Jun. 25, 2008 for U.S. Appl. No. 10/735,407, filed Dec. 12, 2003.
Parker; Non-Final Office Action mailed Sep. 21, 2007, U.S. Appl. No. 10/735,405, filed Dec. 12, 2003.
Parker; Non-Final Office Action mailed Jul. 14, 2005, U.S. Appl. No. 10/735,101, filed Dec. 12, 2003.
Parker; Notice of Allowance and Fees Due mailed Sep. 30, 2005, U.S. Appl. No. 10/735,101, filed Dec. 12, 2003.
Parker; Non-Final Office Action mailed Jan. 16, 2007, U.S. Appl. No. 11/314,045, filed Dec. 20, 2005.
Parker; Final Office Action mailed Jun. 20, 2007, U.S. Appl. No. 11/314,045, filed Dec. 20, 2005.
Parker; Non-Final Office Action mailed Aug. 31, 2007, U.S. Appl. No. 11/314,045, filed Dec. 20, 2005.
Parker; Non-Final Office Action mailed Apr. 6, 2007, U.S. Appl. No. 10/735,099, filed Dec. 12, 2003.
Parker; Final Office Action mailed Oct. 1, 2007, U.S. Appl. No. 10/735,099, filed Dec. 20, 2005.

* cited by examiner

EFFICIENCY REPORT INCORPORATING COMMUNICATION SWITCH STATISTICS

CROSS-REFERENCE TO RELATED APPLICATION

This application is a continuation of copending U.S. utility application having Ser. No. 11/314,045, filed Dec. 20, 2005, which is a continuation of U.S. utility application having Ser. No. 10/735,101, filed Dec. 12, 2003, now U.S. Pat. No. 6,983,045, both which are entirely incorporated herein by reference.

TECHNICAL FIELD

The present disclosure is generally related to report generation and, more particularly, is related to efficiency report generation

BACKGROUND

Various aspects of call center operations are typically directed by an operations group made up of a number of staff personnel who operate a computer system that may be referred to as a workforce management computer system. This computer system is communicatively coupled to a communication switch that provides telecommunication services to one or more call centers. Telephone call statistics related to call center operations are transmitted by the communication switch to the workforce management computer system, where the operations group then performs data gathering, analysis, and prediction with the goal of managing the labor force that operates a call center. In addition to obtaining call statistics from the communication switch, the data gathering aspect also includes obtaining information from the call center, such information including operator attendance data, operator efficiency data, and operator availability data.

Such operator-related information is often provided by call center staff who routinely monitor call center telephone operators by carrying out, what are known in the industry as, "observations." These observations are typically carried out during a certain number of times every month, upon each operator of a call center. While some aspects of these observations, such as for example, evaluating the contents of the phone conversations, are subjective in nature, other evaluation parameters such as the length of time that the operator is physically seated at her position and the number of calls that are dropped by the operator, can be measured in a distinctly quantifiable manner with a higher degree of objectivity and accuracy.

Other employees in the call center include a staffing group that accepts guidance from the operations group and suitably increases or decreases the number of operators at any given instance, based on current and predicted call volume. The staffing personnel also carry out hiring and firing duties that include the hiring of temporary operators. A number of these activities are recorded on paper as well as on individual computers that are used by the staffing personnel, using a set of entry codes that have been assigned/defined for this staffing group.

The call center also typically includes a management information services (MIS) group whose duties include salary calculations/payments related to the operators. The calculations and recording of data regarding these payments is carried out in computers that are used by the MIS group. Here again, the MIS staff use their own set of entry codes, which may or may not be identical to those used by the staffing group, in spite of the MIS group using information such as attendance data provided by the staffing group, to calculate salaries. Often, the attendance data and other such data is provided by the staffing group to the MIS group in the form of paper documentation, or in the form of electronic spreadsheets. This data is then typically used by the MIS group to produce a second set of paper documents or a second set of spreadsheets relating to MIS material such as payroll.

Several other groups in the call center carry out their activities, computer-oriented and otherwise, in this disjointed fashion wherein data transmitted from one group to another is neither streamlined nor standardized across the organization. This diverse collection of entry codes as well as relevant data is used by the operations group in their activities for streamlining call center operations, such as labor force management.

This type of work environment that uses non-standardized entry codes, non-integrated computer networks, and disconnected pieces of information, requires a large degree of manual intervention, thereby leading to various inefficiencies. Such inefficiencies contribute to a loss in terms of resources, time, and money.

Consequently, it is desirable to implement a system that overcomes these deficiencies.

SUMMARY OF THE DISCLOSURE

One embodiment among others, of the present disclosure includes generating an efficiency report by obtaining a set of switching statistics from a communication switch and integrating this set of switching statistics with a set of work statistics of an operator to generate the efficiency report.

Other systems, methods, and/or computer program products according to embodiments will be or become apparent to one skilled in the art upon review of the following drawings and detailed description. It is intended that all such additional systems, methods, and/or computer program products be included within this description and be within the scope of the present disclosure.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in drawings, like reference numerals designate corresponding parts throughout the several views.

DETAILED DESCRIPTION

While the description below refers to certain exemplary embodiments, it is to be understood that the disclosure is not limited to these particular embodiments. On the contrary, the intent is to cover all alternatives, modifications and equivalents included within the spirit and scope of the disclosure as defined by the appended claims. Also, the terminology used herein is for the purpose of description and not of limitation.

Figure 1:
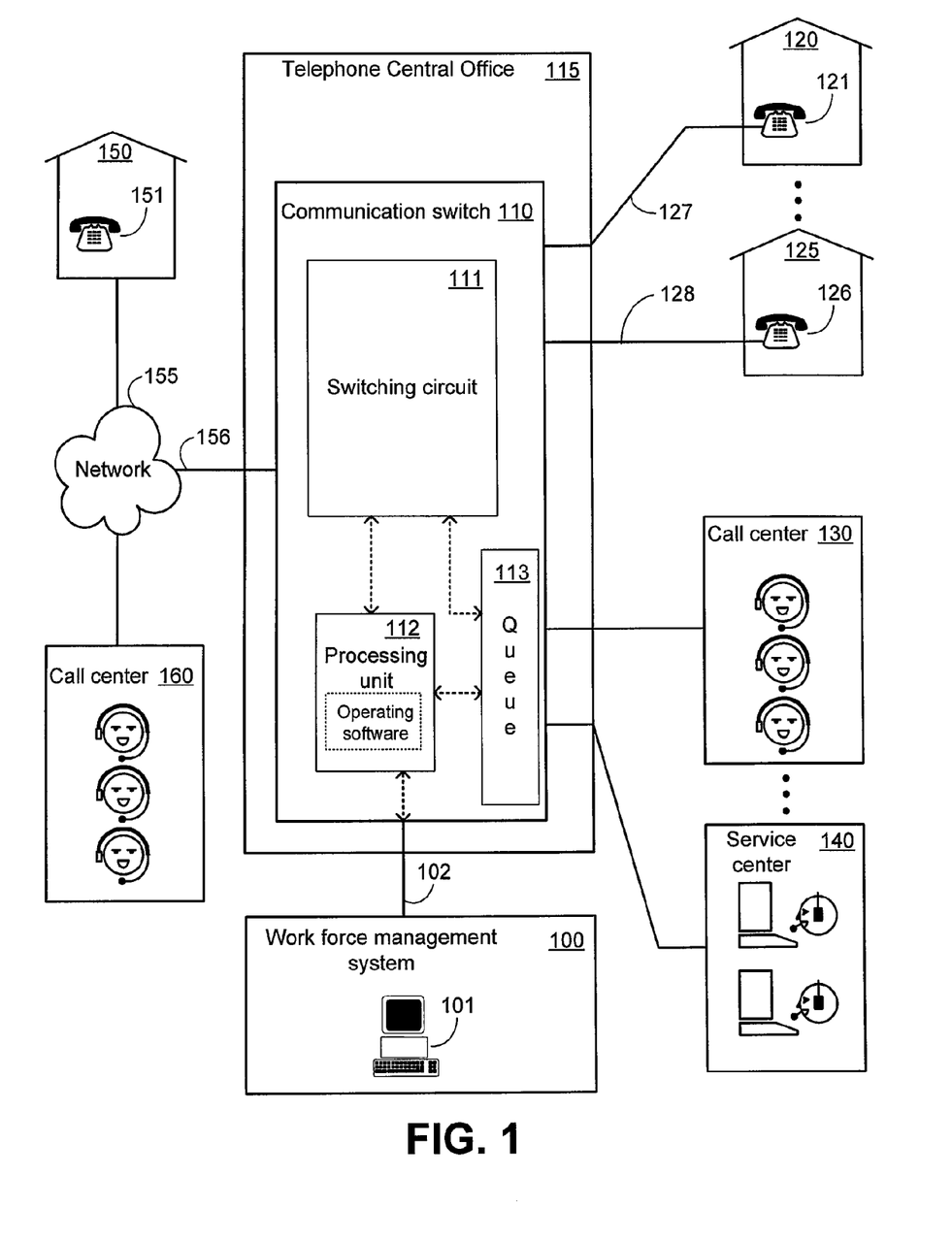
FIG. 1 is a block diagram of a workforce management system communicatively coupled to a communications switch that provides switching services to one or more workforce centers.

FIG. 1 is a block diagram of a workforce management system 100 communicatively coupled to a communications switch 110, which in this exemplary embodiment, is a plain old telephone service (POTS) switch located in a telephone central office (CO) 115. The POTS switch is connected on its trunk side to network 155, which in this first embodiment is the public switched telephone network (PSTN). The POTS switch of this embodiment provides telephone service to many customers, such as residential customers located in residences 120 and 125 that are connected to the line side of the POTS switch via links 127 and 128 that constitute the telephone local loop. These residences contain telephones 121 and 126 as shown, but may additionally accommodate communication devices such as PCs used by the residential customers for Internet access.

The POTS switch of this embodiment may be further configured to provide telephone services, via the PSTN of this embodiment, to an additional residential customer located in residence 150. The residential customer in residence 150 communicates with a customer in residence 120, by obtaining a connection through the PSTN and through the POTS switch in this embodiment. This type of customer who is located outside an local access transport area (LATA) served by the switch, is classified as a long-distance customer, and is sometimes referred to as an inter-LATA customer.

Communication switch 115 is further configured to provide telecommunication services such as routing telephone calls from telephone customers in residences 120, 125, and 150 to telephone operators located in a call center 130. The telephone operators inside call center 130 provide a number of customer services such as directory assistance and operator-assisted call connections.

In a second exemplary embodiment, communication switch 110 comprises a digital subscriber line access multiplexer (DSLAM) to provide Internet access and various data services to residences 120, 125, and 150, and also to business customers located in businesses (not shown) that are connected to the DSLAM either via the local loop or via network 155. The DSLAM of this second exemplary embodiment is typically configured to route data traffic to a server that is located in an Internet service provider (ISP) location. Routing of data traffic is carried out over network 155 that in this exemplary second embodiment, comprises the Internet.

In a third exemplary embodiment, communication switch 110 comprises a device that is referred to in the industry as a softswitch, or alternatively comprises a device that is referred to in the industry as a gateway. The softswitch/gateway of this third exemplary embodiment switches data packets in providing data services to residences 120, 125, and 150, and also to business customers located in businesses (not shown) that are connected to the device either via the local loop or via network 155. Network 155 will comprise the Internet in this third exemplary embodiment.

The softswitch/gateway of this exemplary embodiment is not necessarily confined to providing data services, but can also be configured to provide voice services over a packet network such as the Internet. One example of such a voice service uses voice-over-Internet protocol (VoIP) to carries voice data as IP packets over the network. With reference to this example, residence 150 or a business (not shown) that is connected to the Internet (network 155) is, in various embodiments, an international customer located in a country outside the country in which the communication switch 110 is located. Similarly, a call center 160 that is shown connected into network 155 is, in various embodiments, a call center located in a foreign country. Call center 160 and other service centers that are connected to network 155 at an international location, are, in various embodiments, used to provide services to customers such as the ones in residences 120, 125, and 150.

Drawing further attention to FIG. 1, service center 140 is connected to communications switch 140 to permit service center operators to provide additional services to residential and/or business customers. Such services may include functions that are similar to that provided by the call center operators, but also comprise many other types of services that include voice as well as data operations.

As one example among many, such services include manual e-mail responses that do not require telephone conversations. A second example involves responding to customer queries related to product support. A third example involves handling of a business transaction such as an automated credit card payment. It will be understood that such transactions encompass a wide variety of voice transactions carried out over the PSTN, as well as data transactions carried out over a private and/or a public data network including the PSTN and the Internet. It further includes voice transactions that are carried over data networks, for example, as a Voice-over-IP call.

Work force management system (WFMS) 100 that is shown communicatively coupled to switch 115, includes a workforce computer system 101 that in various embodiments comprises one machine or several machines. In various embodiments, these machines are PCs, workstations, or other computing platforms, that are used in an individual configuration, or comprise a network of several units. WFMS 100 is typically located either inside CO 115 or in an outside office. Typically, WFMS 100 is located in an outside office, that is in certain instances, a geographically remote office located in a city other than the city in which the CO 115 is located.

WFMS 100 is configured to manage certain operations of centers such as call center 130 and service center 140. Such operations include call-volume analysis, call-volume prediction, and producing work schedules for the call center operators based on the predicted call-volume. Call-volume analysis is carried out by obtaining from the communication switch 110, call-statistics such as total number of calls routed to one or more centers, and types of such calls routed, and also by obtaining from one or more call centers, call-handling-statistics such as calls answered, calls abandoned, and average wait times. Call-statistics are typically obtained via digital data that is transported on link 102 from switch 110 to WFMS 100. In various embodiments, link 102 uses various types of hardware and software. In one example among many, link 102 is a circuit switched link such as a T1 line carrying TDM data. In a second example link 102 is a packet switched link carrying data packets using a TCP/IP format.

Once WFMS 100 receives the call-statistics, a call-load history is generated from which future call-loads are predicted. Based on these predictions, the work force in one or more call centers are scheduled in a process that is known in the industry as "tours." Work scheduling is used to adjust the number of call operators at various instances of time depending upon expected call volume. Furthermore, switching processes in switch 110 that are related to routing of calls to the call centers, as well as providing call-weighting (e.g. by adding wait times) to such calls, can be modified at switch 110 upon request from WFMS 100. Such a request is often carried out via telephone calls between the staff of WFMS 100 and those of CO 115.

WFMS 100 is also configured to handle certain other functions related to call center operators. Some of these functions include payroll, attendance, record keeping, and personnel management tasks such as hiring and firing.

Drawing attention to communication switch 110 of FIG. 1, a few operational blocks that are associated with call center operations are shown inside switch 110. Switching circuit 111 carries out the switching function to switch calls originated by customers such as a residential customer from residence 120. Such a call may relate to directory assistance where the customer is seeking directory information, requiring manual servicing by an operator in call center 130. Switching circuit 111 provides the necessary connections to direct this call, in digital data form, to a queue 113. Queue 113 is typically a first-in-first-out (FIFO) buffer system that regulates the transfer of this call together with any others that may be occurring during this time, to call center 130 or service center 140. The queuing process also typically incorporates a weighting scheme to decide the order in which these calls are place into, and consequently routed out of, the queue 113. One example, among many, of a weighting scheme uses a "wait time" factor that determines how quickly an individual call is processed and transported out of the switch. The call is routed from queue 113 to a call center operator in call center 130 for example. Processing unit 112 is typically, a central processing unit (CPU) comprising hardware and software that is a part of communication switch 110. The software inside processing unit 112 includes operating software that controls switching circuit 111, queue 113 and other circuits inside communication switch 110. Processing unit 112 further includes software for interfacing switch 110 to WFMS 100 via link 102.

It will be understood that similar mechanisms for switching and queuing may be employed to interface switch 110 to call center 160 to provide customer service for customers in residences 120, 125, and 150. It will also be understood that WFMS 100 can be communicatively coupled to communication switch 110 through network 155, thereby allowing WFMS 100 to be remotely located.

Figure 2:
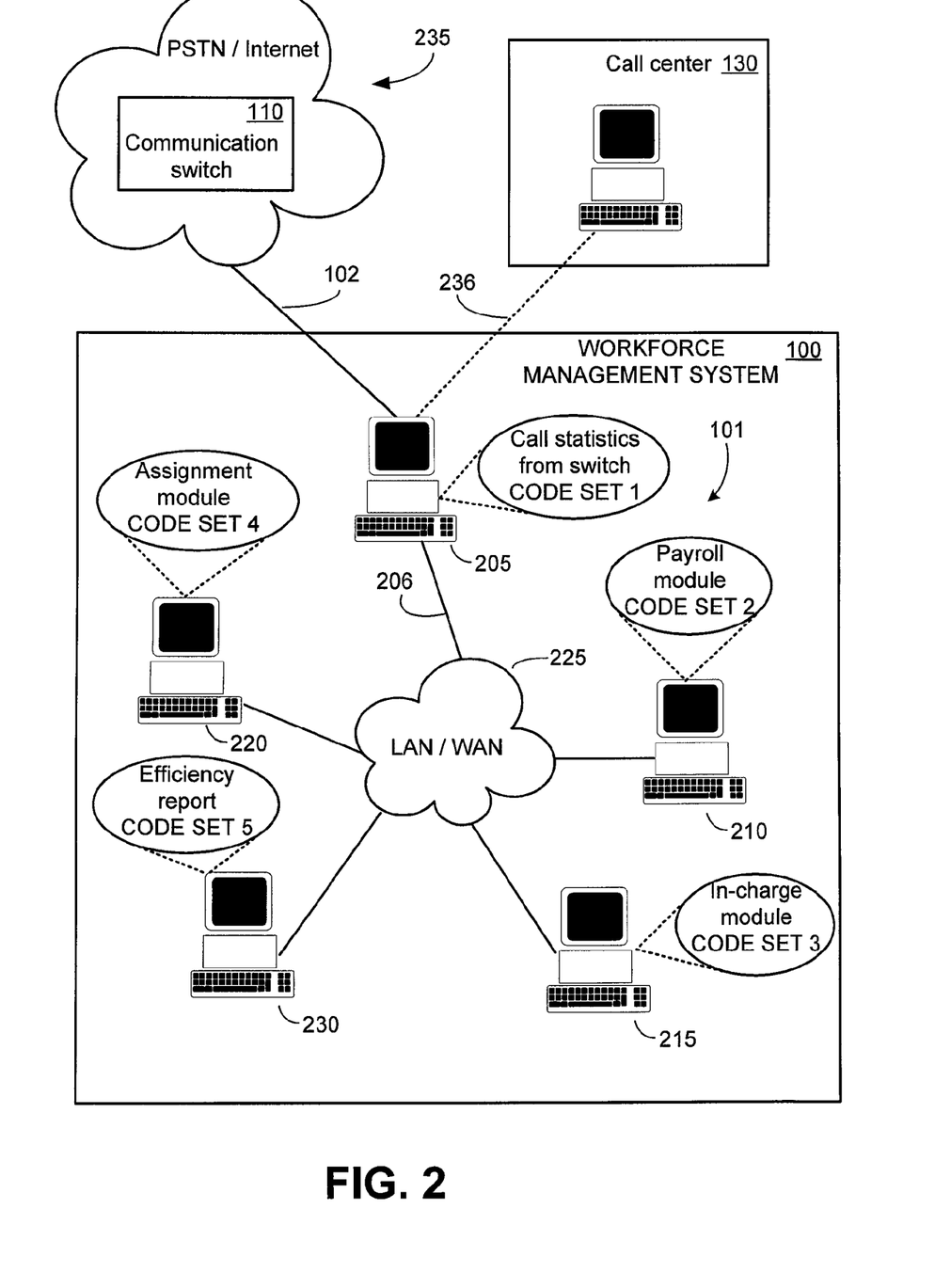
FIG. 2 is a block diagram of a workforce management system comprising a network of computing elements, the management system being communicatively coupled to a communication switch that is a part of the POTS network and/or the Internet.

FIG. 2 illustrates one exemplary embodiment among several such embodiments, wherein WFMS 100 comprises workforce computer system 101 configured as a network of computing elements. Computing elements 205, 210, 215, 220, and 230 are five example elements that comprise five PCs, five workstations, five work platforms, and combinations thereof. Element 205 operates in this example as a server/gateway device. While five such elements are shown in FIG. 2 it will be understood that the number of elements in such a network configuration can be any number greater than two. The five elements of FIG. 2 are interconnected to each other by a network 225 that is a local area network (LAN) and/or a wide area network (WAN) comprising a variety of hardware and software elements that incorporate various standards and formats. One example among many, of such a network is an Ethernet LAN transporting data packets using an Ethernet protocol. A second example is a WAN transporting data cells in an ATM format. The five elements shown in this example, are located inside a single building or alternatively, be housed in several buildings that include one or more call centers. They can also be interconnected to each other, to other communication devices, and to communication links in several other appropriate configurations.

In a first exemplary configuration, element 205 operates in a client-server configuration where communication switch 110 that is shown as a part of network 235, operates as a server and element 205 operates as its client. In the context of such a configuration, link 102 is a communication link that transports data packets, and network 235 is a packet network such as the Internet.

In a second exemplary configuration, element 205 operates in a master-slave configuration where communication switch 110 that is shown as a part of network 235, operates as a master device and element 205 its slave. In the context of this second exemplary configuration, link 102 is a communication link that transports circuit switched data, and network 235 is a circuit switched network such as the PSTN.

In general, in operation as a server device, element 205 provides a number of software application modules that may be used by the computing elements interconnected via network 225. While it is not necessary that all these software modules be solely resident in computing element 205, it is generally understood that it is configured in this manner in many system applications.

Element 205 may also be communicatively coupled to one or more computers that are located in one or more call centers, either through communication switch 110 or directly through other communication links as indicated by the dashed line of link 236. FIG. 2 shows one example where a computer in call center 130 is coupled to element 205 through link 236. Link 236 operates in a manner similar to that described for link 102 above. Among other data, administrative information, such as employee work statistics, can be electronically communicated by the computer in call center 130 to the computing element 205.

Generally, element 205 provides a number of software application modules that are used locally by the computing elements interconnected via network 225, and/or remotely by the computer in call center 130 as well as computers elsewhere that are communicatively coupled to element 205. While it is not necessary that all these software modules be solely resident in computing element 205, it is generally understood that it is configured in this manner in many system applications.

FIG. 2 illustrates a WFMS operator (not shown) at element 205 using an appropriate software module to obtain call statistics from communication switch 110. A second WFMS operator, a payroll employee for example, at element 210 accesses an appropriate software module to process payroll information related to various call center operators. A third WFMS operator at element 215 accesses an appropriate software module to process attendance information related to various call center operators. A fourth WFMS operator at element 220 accesses an appropriate software module to process work-assignment information for various call center operators. And, a fifth operator at element 230 accesses an appropriate software module to produce an efficiency report that integrates the various data input by the other WFMS operators. In this example, each of the five WFMS operators uses a unique set of designated entry codes to carry out their functions.

As one example, among many, the WFMS operator using element 210 enters a code that indicates a "guaranteed paid holiday to a non-management employee" by typing "HO" into his or her payroll application; while the WFMS operator using element 215 types "HOL," into his or her attendance tracking application as a second entry code relating to the same guaranteed paid holiday to a non-management employee. Similarly, the fourth WFMS operator at element 220 types in "HOF," into his or her work-assignments application as a third entry code relating to the same guaranteed paid holiday to a non-management employee The fifth WFMS operator at element 230 types in "HOLP" into his or her efficiency reporting application if he or she chooses to enter a fourth entry code relating to the same guaranteed paid holiday to a non-management employee.

In one among several exemplary embodiments of the disclosure, the fifth WFMS operator can utilize data that is provided by the four elements 205, 210, 215, and 220 to produce an efficiency report. To do so, element 230 is configured to suitably interpret/translate the various entry codes of elements 205, 210, 215, and 220 thereby allowing the importing of various data from these elements (including data related to a guaranteed paid holiday to a non-management employee), and produce an efficiency report that may be in the form of a spreadsheet, and comprehensively integrates all the relevant data from these elements. This is explained in further detail using other figures. The efficiency report comprises a tabular format, a graphical format, and/or a text format that may be incorporated in a paper document and/or an electronic medium. Electronic media includes, but is not limited to, electronic transmission devices and/or display devices such as a computer display and/or a personal digital assistant (PDA).

Figure 3:
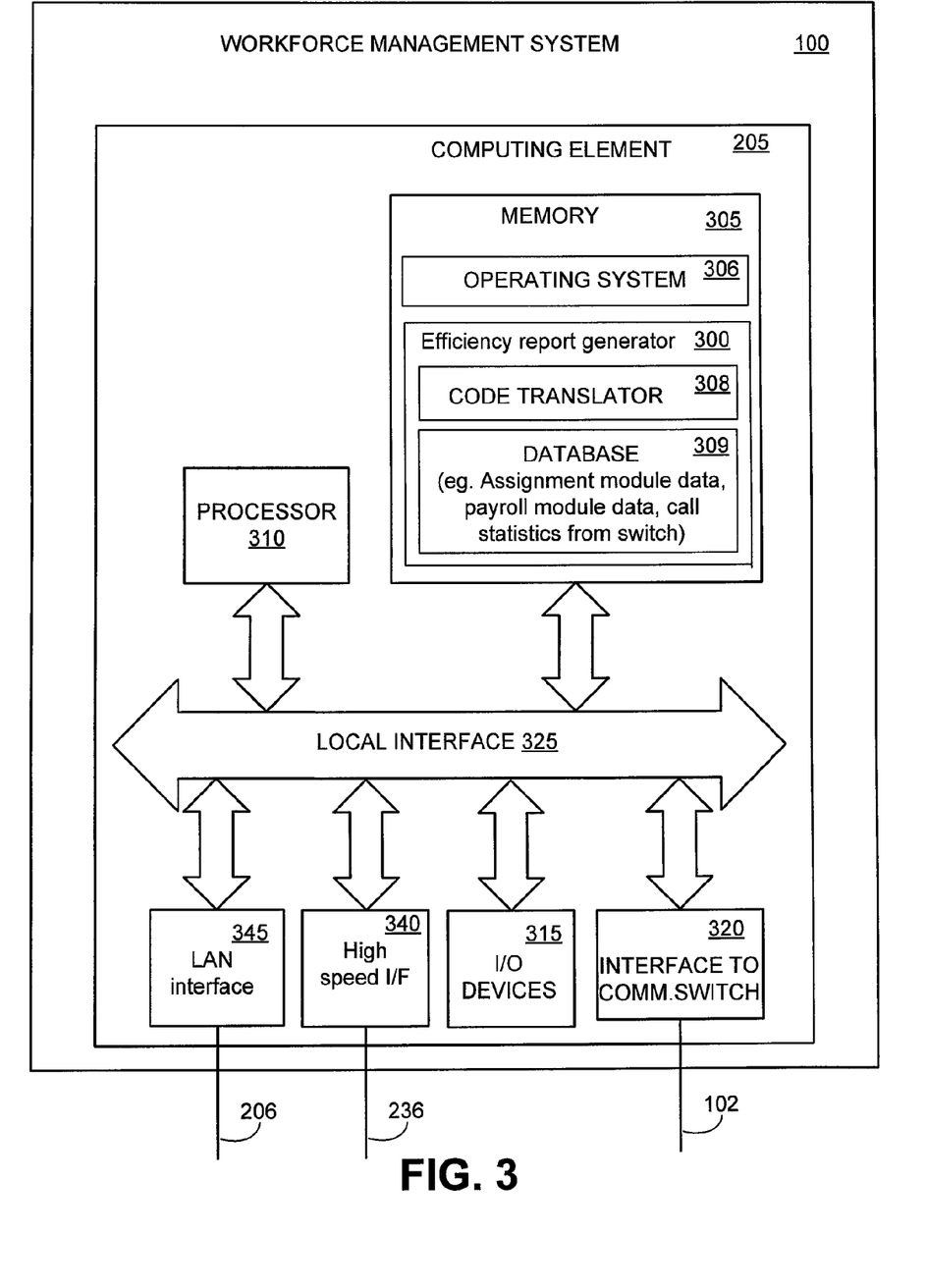
FIG. 3 is a block diagram illustrating various functional blocks of one embodiment of a computing element of the workforce management system of FIG. 1, where the computing element is configured to process data from one or more call centers and the communications switch, to produce an efficiency report.

FIG. 3 is a block diagram illustrating various functional blocks incorporated inside element 205 of WFMS 100. Generally, in terms of hardware architecture, as shown in FIG. 3, computing element 205 includes several elements that are communicatively coupled to one another via a local interface 325. Some example elements include a processor 310, memory 305, a communication switch interface 320, a LAN interface 345, a high-speed interface 340, and one or more input/output (I/O)devices 315 (or peripherals).

The local interface 325 can be, for example but not limited to, one or more buses or other wired or wireless connections, as is known in the art. The local interface 325 may have additional elements, which are omitted for simplicity, such as controllers, buffers (caches), drivers, repeaters, and receivers, to enable communications. Further, the local interface includes address, control, and/or data connections to enable appropriate communications among the aforementioned components.

The processor 310 is a hardware device for executing software, particularly that stored in memory 305. The processor 310 can be any custom made or commercially available processor, a central processing unit (CPU), an auxiliary processor among several processors associated with the computing element 205, a semiconductor based microprocessor (in the form of a microchip or chip set), a macroprocessor, or generally any device for executing software instructions.

The memory 305 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 305 may incorporate electronic, magnetic, optical, and/or other types of storage media. Note that the memory 305 can have a distributed architecture, where various components are situated remote from one another, but can be accessed by the processor 310.

The software in memory 305 includes one or more separate programs, each of which comprises an ordered listing of executable instructions for implementing logical functions. In the example of FIG. 3, the software in the memory 305 includes a efficiency report generator 300 that is one among several embodiments of the present disclosure, and a suitable operating system (O/S) 306. A nonexhaustive list of examples of suitable commercially available operating systems 306 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; or (f) an appliance-based operating system, such as that implemented in handheld computers or personal data assistants (PDAs) (e.g., PalmOS available from Palm Computing, Inc., and Windows CE available from Microsoft Corporation). The operating system 306 essentially controls the execution of other computer programs, such as the efficiency report generator 300, and provides scheduling, input-output control, file and data management, memory management, and communication control and related services.

In some embodiments, the efficiency report generator 300 is implemented using logic incorporated in programs such as a source program, executable program (object code), script, or any other entity comprising a set of instructions to be performed. When a source program, then the program needs to be translated via a compiler, assembler, interpreter, or the like, which may or may not be included within the memory 305, so as to operate properly in connection with the O/S 306. Furthermore, the efficiency report generator 300 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 315 includes input devices, for example but not limited to, keyboard, mouse, scanner, microphone, etc. Furthermore, the I/O devices 315 also include output devices, for example but not limited to, a printer, display, etc. Finally, the I/O devices 315 further include devices that communicate both inputs and outputs, for instance but not limited to, a modulator/demodulator (modem; for accessing another device, system, or network), a radio frequency (RF) or other transceiver, a telephonic interface, a bridge, a router, etc.

Also shown in computing element 205 is a communication switch interface 320 that provides a digital communication link 102 between computing element 205 and a communication switch such as communication switch 110 of FIGS. 1 and 2.

If the computing element 205 is a PC, workstation, or the like, the software in the memory 305 further includes a basic input output system (BIOS) (omitted for simplicity). The BIOS is a set of essential software routines that initialize and test hardware at startup, start the O/S 306, and support the transfer of data among the hardware devices. The BIOS is stored in ROM so that the BIOS can be executed when the computing element 205 is activated.

When the computing element 205 is in operation, the processor 310 is configured to execute software stored within the memory 305, to communicate data to and from the memory 305, and to generally control operations of the computing element 205 pursuant to the software. The efficiency report generator 300 and the O/S 306, in whole or in part, but typically the latter, are read by the processor 310, perhaps buffered within the processor 310, and then executed.

When the efficiency report generator 300 is implemented in software, as is shown in FIG. 3 hereafter, it should be noted that the efficiency report generator 300 can be stored on any computer readable medium for use by or in connection with any computer related system or method. For example, the efficiency report generator 300 can be detailed in a computer program or script that runs on a stand-alone server, a network server, or on one or more computers that are part of a network.

In the context of this document, a computer readable medium is an electronic, magnetic, optical, or other physical device or means that can contain or store a computer program for use by or in connection with a computer related system or method. The efficiency report generator 300 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the efficiency report generator 300 is implemented using hardware logic, the efficiency report generator 300 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The hardware can be housed in a stand-alone computer or in one or more computers of a network.

Drawing attention to efficiency report generator 300 of FIG. 3, two functional blocks among many are shown as a code translator 308 and a reference database 309. While code translator 308 and reference database 309 are shown in FIG. 3 as two separate blocks, this illustration has been done merely for the sake of convenience in describing their operations. Both blocks can be integrated into a single database for example, and the data contained in these blocks may be stored as well as shared between the two blocks shown. Other functional blocks that operate to implement efficiency report generator 300 have not been shown, and will be understood in the context of implementations as described in the following pages.

Database 309 comprises, in one exemplary embodiment, data that is formatted for processing by a structured query language (SQL) program. In alternative embodiments, other programs such as, but not limited to, Microsoft Excel™, Microsoft Access™, and Oracle are used. Also, in other embodiments, unformatted data is stored in database 309.

Database 309 contains data that is relevant to efficiency report generator 300, for example, but not limited to, employee data related to the various operators employed in the call centers. In one embodiment among many, this data includes time sheets and work attendance data, wherein such data is of an individual nature and/or cumulative data encompassing a set of operators of one or more call centers. Examples of this data, include, but are not limited to, total hours that attendants, supervisors, and/or trainees were available to handle calls, training hours, vacation data, and medical leave data.

In this as well as other embodiments, database 309 additionally contains call-related statistics that have been provided by a communication switch, such as communication switch 110 of FIGS. 1 and 2 through communication switch interface 320. In this context, communication switch interface 320 comprises a digital interface device that performs an electronic handshake with processing unit 112 located inside the communication switch 110, and downloads pertinent data via link 102. Alternatively, other methods are employed to configure database 309. One such method includes a manual entry by an operator through I/O devices 315 that in one example is a keyboard or a mouse. Manual entry methods include entering data values into a spreadsheet for example, the spreadsheet being stored in database 309. The operator can obtain outputs such as printouts and on-screen displays of the spreadsheet, as well as other information pertinent to computing element 205 via suitable devices such as printers and displays of I/O devices 315.

In one or more embodiments, call-related statistics include, but are not limited to the number of calls forwarded from communication switch 110 to one or more call centers, telephone numbers, call duration, originating source, (e.g., phone number of calling party) call center identification and call center related data as well, position seizures, revenue and deviations. It also includes a breakdown of the nature of the calls, such as the number of directory assistance calls and/or the number of toll calls. Additionally, it includes various work volumes related to these calls as recorded in the communication switch.

Other elements of data/information that are stored in database 309 will be identified or made obvious by further explanations that are done below with reference to other figures.

Computing element 205 may also communicate with various devices, such as personal computers, that are located in one or more call centers, to obtain data that is then be stored in database 308. The communication between computing element 205 and the call centers may take place through communication switch 110, or through alternative means that do not involve communication switch 110. Such alternative means includes wireline/wireless communication devices such as microwave links, cell phones, and fiberoptic transceivers. Also included is written material, for example, documentation that is exchanged by regular mail between operators of the call centers and those of WFMS 100.

Figure 4:
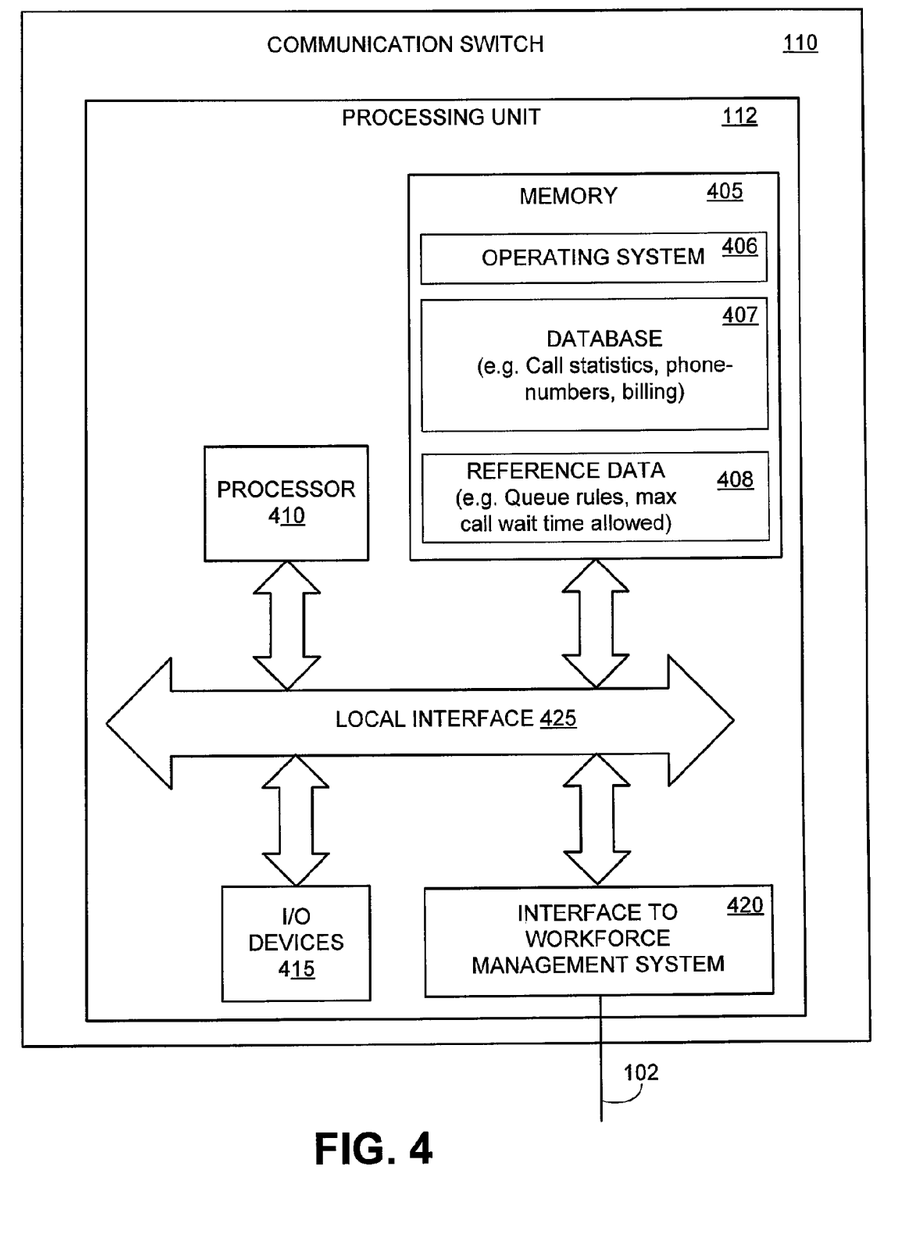
FIG. 4 is a block diagram illustrating various functional blocks of one embodiment of a communication switch processing unit that is located inside the communications switch of FIG. 1, the communication switch processing unit being communicatively coupled to the workforce management system of FIG. 3.

FIG. 4 is a block diagram illustrating various functional blocks incorporated inside processing unit 112 of communication switch 110. Generally, in terms of hardware architecture, as shown in FIG. 4, processing unit 112 includes a processor 410, memory 405, a WFMS interface 420, and one or more input and/or output (I/O) devices 415 (or peripherals) that are communicatively coupled via a local interface 425. It will be understood by persons of ordinary skill in the art, that the description of the hardware in FIG. 4 can be generally understood from the description provided for the equivalent hardware blocks shown in FIG. 3.

Processing unit 112 is generally configured to perform functions that are typically carried out by a controller circuit of a communication switch such as communication switch 110. Such functions typically encompass operations, administration, maintenance, and provisioning (OAMP) functions that are associated with switch 110. Additionally, processing unit 112 is configured to interface with WFMS 100 and to provide switching statistics to WFMS 100. This is carried out via WFMS interface 420 that transmits digital data to WFMS 100 through link 102.

Memory 405 includes database 407 and reference database 408. While shown as two distinct database, it will be understood that this has been done merely for purposes of explanation, and several other database configurations can be used alternatively. These configurations include the use of databases located inside elements other than processing unit 112. Database 407 contains data that is used by communication switch 110 and/or the efficiency report generator 300 (FIG. 3). Such data relates to the switching functions carried out by communication switch 110, and also for implementing the efficiency report generator 300. Alternatively, it is solely dedicated to providing the data pertinent to, and requested by, efficiency report generator 300.

In the example where communication switch 110 is a POTS switch, this data comprises call-related data, such as, but not limited to, call routing software, billing information, call-completed data such as call origination details, length of call, destination details, time data etc., call set-up data such as programmed wait times, call density, average wait time, and other such data.

Reference database 408 typically holds data that is specifically relevant to efficiency report generator 300. Such data includes, but is not limited to, call center information, queuing rules for routing calls to the call/service centers, and wait time information for programming upon calls originating from specific geographical locations served by the switch.

Figure 5:
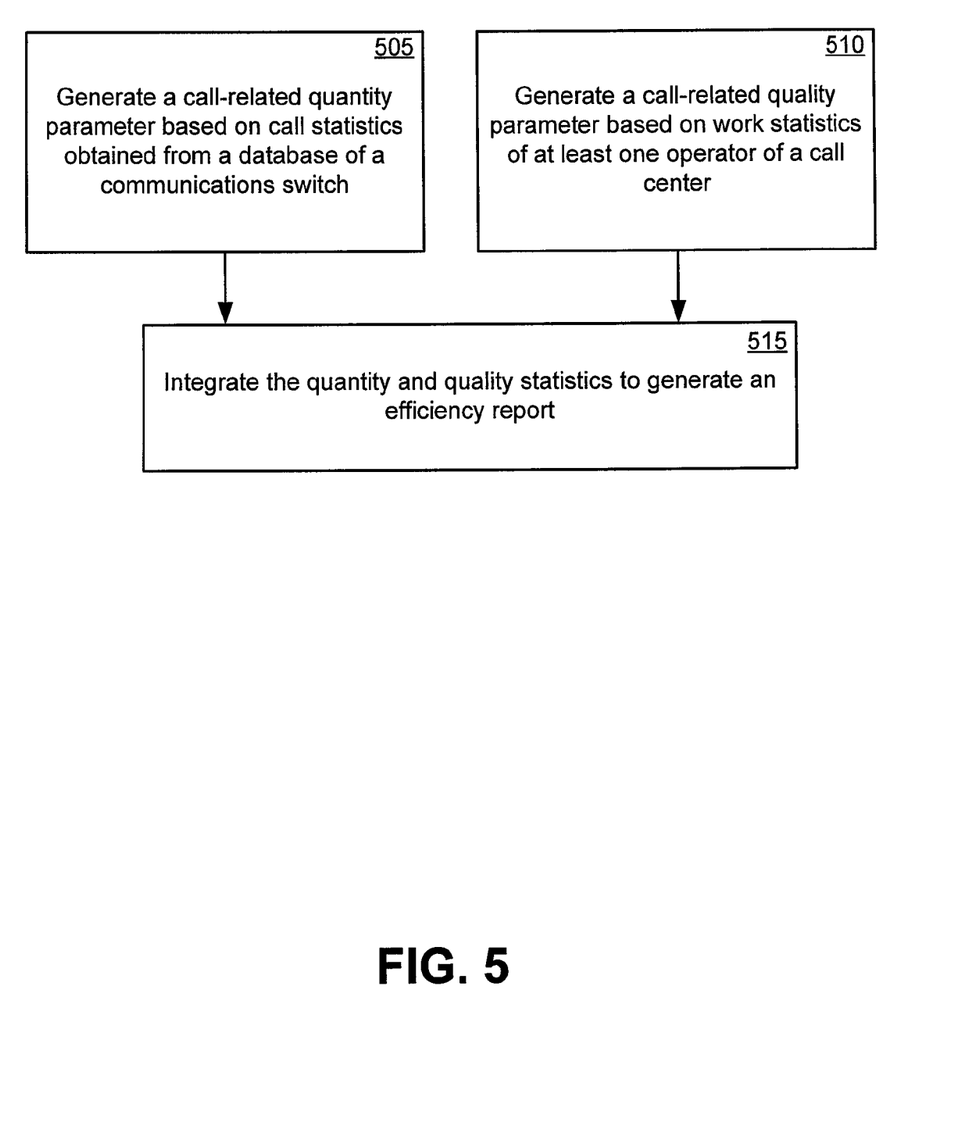
FIG. 5 is a flowchart describing one embodiment among many, of a method using quality and quantity statistics to generate the efficiency report of FIG. 3.
Figure 6:
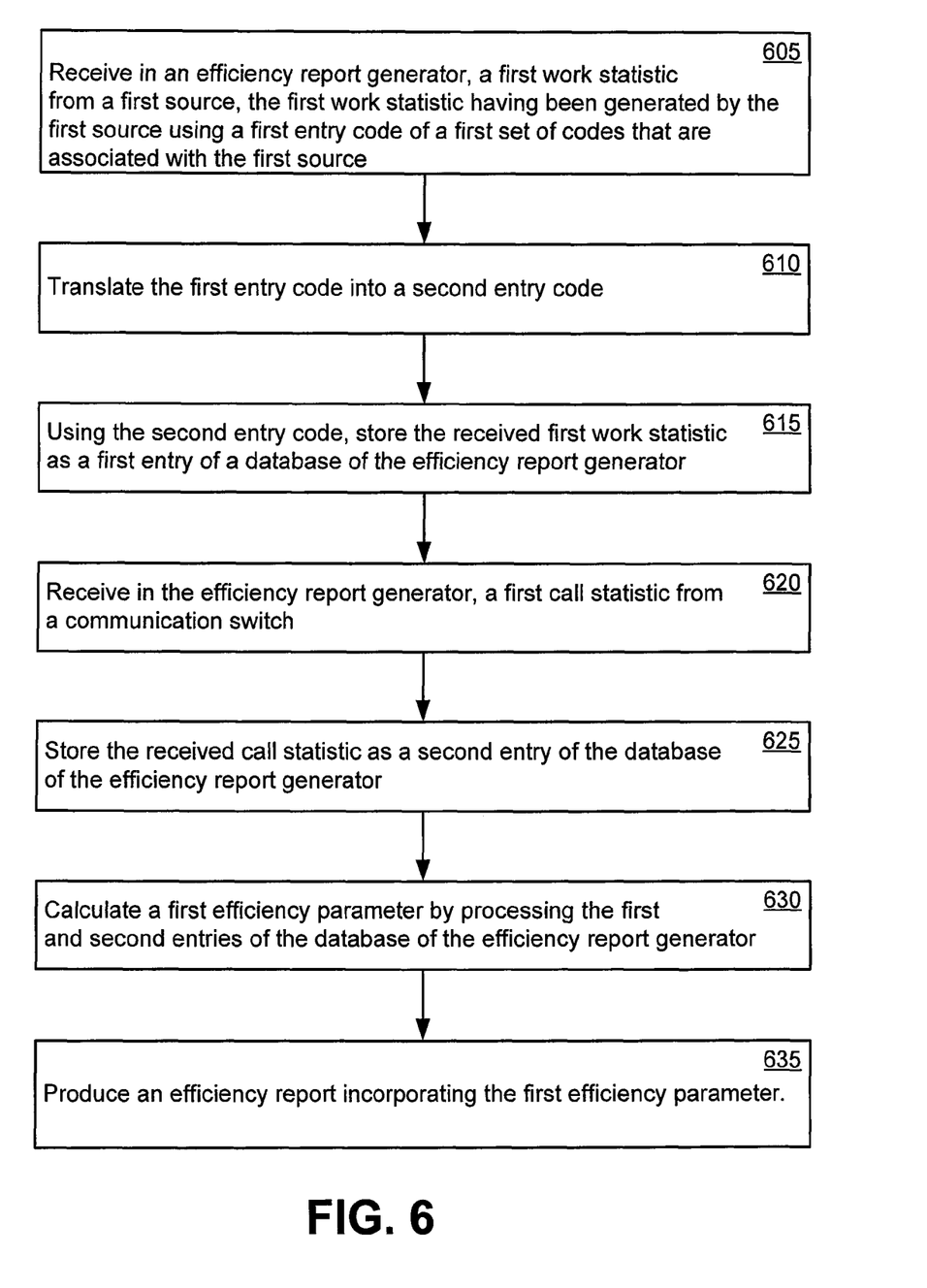
FIG. 6 is a flowchart describing a second embodiment among many, of a method using a work statistic and a call statistic to generate the efficiency report of FIG. 3.
Figure 7:
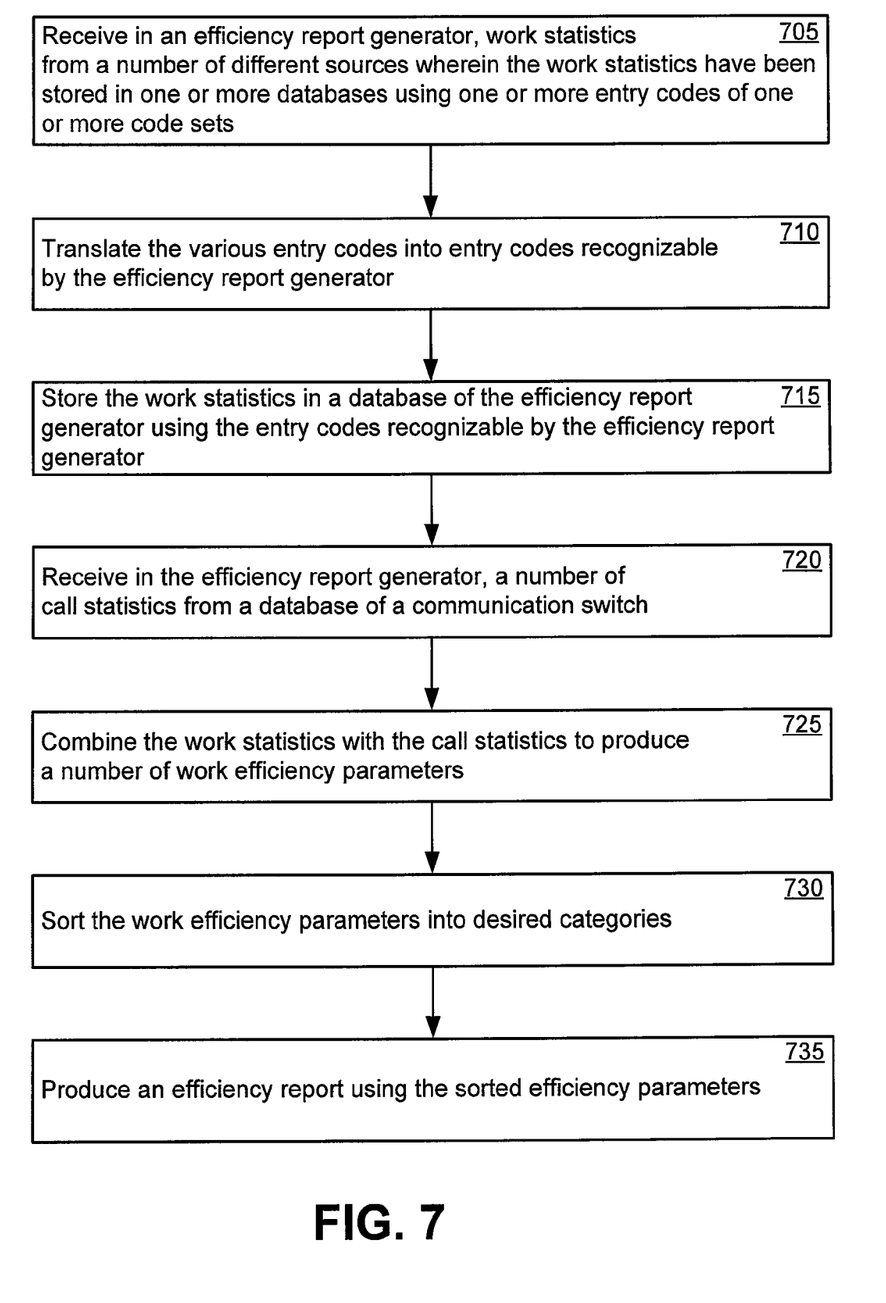
FIG. 7 is a flowchart describing a third embodiment among many, of a method using a number of work statistics and call statistics to generate the efficiency report of FIG. 3.
Figure 8:
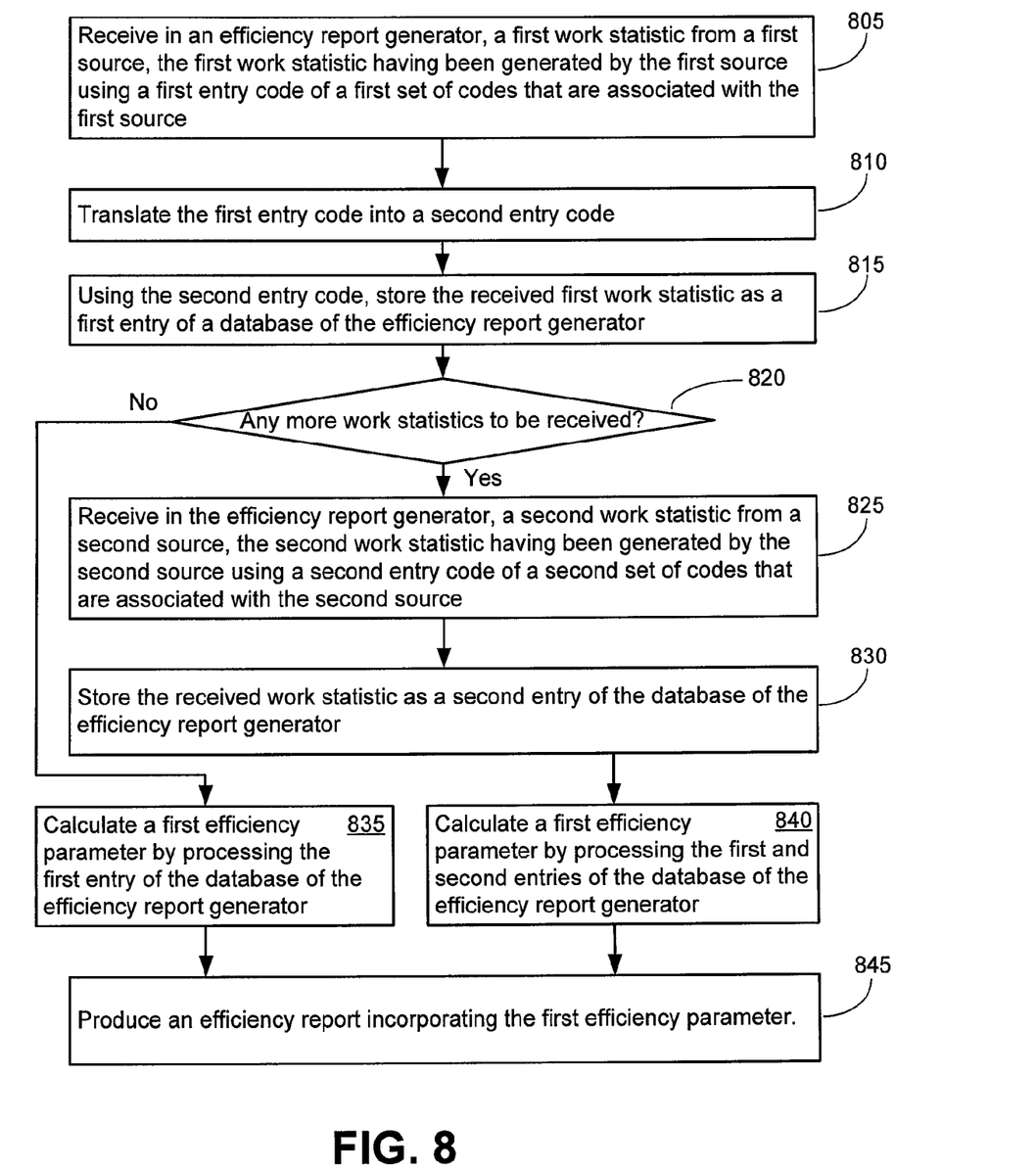
FIG. 8 is a flowchart describing a fourth embodiment among many, of a method using work statistics to generate the efficiency report of FIG. 3.

FIG. 5 is a flowchart to describe one embodiment, among several embodiments, for implementing the efficiency report generator 300 shown in FIG. 3. It is to be understood that any process steps or blocks shown in FIG. 5 as well as FIGS. 6 through 8, represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved. Code may also be contained in several devices of the disclosure, and may not be necessarily confined to any particular device. The explanation below, while possibly implying code residency and functionality in certain devices, does so solely for the purposes of explaining the concept behind the disclosure, and the description should not be construed as a limiting parameter for the disclosure's various implementations in other applications.

Drawing attention to FIG. 5, in block 505, a call-related, quantity parameter is generated based on call statistics obtained from a communications switch. The quantity parameter comprises cumulative call routing statistics that relate to one or more call/service centers. One example, among many, of a quantity parameter is an "actual work volume-total" which in this example is the sum of directory assistance and toll calls.

In block 510, a call-related, quality parameter is generated based on work statistics of one or more operators and/or other staff of a call center, such statistics including, but not limited to, total hours that attendants, supervisors, and/or trainees were available to handle calls, training hours, vacation data, and medical leave data. In one embodiment, the data related to these statistics is generated by a payroll group, while in alternative embodiments, the statistics are generated by a work assignments group, or a supervisory group, in one or more call centers. One example, among many, of such a quality parameter is an "actual board hours" which is the number of hours all operators are logged onto position ready to handle calls provided by the communication switch. A second example of a quality parameter is an "average work time" (AWT).

In block 515, the quantity parameter of block 505 is integrated with the quality parameter of block 510 to generate an efficiency report, which is a report that is used to evaluate the quality of services provided by the staff of the WFMS 100. Such services include, but are not limited to, estimating an appropriate number of operators to run call center operations. Using the examples referred to earlier in blocks 505 and 510, the integration in block 575 comprises evaluating the difference between "actual work volume-total" and "actual board hours." The difference data indicates operating efficiency. Furthermore, this difference data is assessed in light of AWT by the WFMS 100 staff to determine what level of overhead would be appropriate for future call center operations, based on past performance as derived from the data in the efficiency report. The level of overhead relates to the workload in terms of calls that an individual and/or a set of operators is estimated to handle. For example, in one embodiment, an operator with a certain level of experience and skills is assigned an overhead higher than that of a trainee. While this example points out the feasibility of judging the efficiency of an individual operator, the efficiency report also provides an overall snapshot of cumulative operational efficiency of a set of operators of one or more call centers.

FIG. 6 is a flowchart to describe a second embodiment, among several embodiments, for implementing the efficiency report generator 300 shown in FIG. 3. In block 605, a work statistic is received in an efficiency report generator, such as the efficiency report generator of FIG. 3. This work statistic is one of several statistics, such as, but not limited to, total hours that one or more attendants, supervisors, and/or trainees were available to handle calls, training hours, vacation data, and medical leave data. Block 605 identifies that this work statistic is obtained from a first source. In this context, a source may comprise several different entities. One example of such a source, is an operator who manually enters the statistic into some suitable medium such as a paper report and/or a spreadsheet stored in a computer. A second example of such a source is a PC or a computer workstation that stores and transmits the statistic automatically, in certain instances by electronically communicating/interacting with a second PC or a workstation. A third example of such a source is a software application such as a server-oriented software, containing a suitable database. Such a software application may comprises several integrated and/or non-integrated software modules that one or more operators can access from multiple PCs or workstations, as was explained with reference to FIG. 2.

Block 605 further states that the work statistic was generated by the first source using one entry code out of a set of codes that are associated with the first source. One example among many, of such an entry code is "HO," which refers to a guaranteed paid holiday to a non-management employee." The use of this code among several operators, was explained earlier using FIG. 2.

An entry code, which in one example is a software macrocode function, allows an operator to input numerical and/or alphanumeric values into a database such as a spreadsheet, or alternatively, the code itself is entered into the database as a value inside a spreadsheet. To further explain, using "HO" as one example, in the first instance, when the operator types in "HO," a software program that is a part of the source or the source itself, prompts the operator to input the number of absences for one particular operator; whereas in the second instance, the operator enters the code word "HO" into a tabular spreadsheet in correspondence to an operator name for a specific calendar date. Therefore, in a first application, the entry code constitutes a prompt function for entering a work statistic, while in a second application, the entry code itself constitutes the work statistic. The entry code "HO" is one among several codes that constitutes a first set of codes used in, for example, a payroll module/application.

Furthermore, "HO" of the example above has, in one example, an equivalent code "HOLP" that is used by an operator while generating an efficiency report, "HOLP" being a entry code that is part of a second set of codes that is used for efficiency report generation. The first code "HO" is translated to the second code "HOLP," as indicated in block 610. The code translation is carried out in the code translator explained in FIG. 3. It will be understood that in certain instances, this code translation will not be carried out when the codes are identical for two different modules. For example, a "V" code for vacation in the assignment module can be the same as a "V" code used in the efficiency report generation module. In this case, no translation would be necessary.

In block 620, a first call-related statistic is obtained from the communication switch, and the statistic is stored (block 625) in the efficiency report generator module. While in the first instance the statistic is stored in the same database as the work statistic, in an alternative instance, the statistic is stored in a second database of the efficiency report generator module.

One of potentially several efficiency parameters is then generated, as shown in block 630. One example of such a generation comprises the calculation of an average work time (AWT) parameter, which is carried out by dividing the sum total of calls (statistic obtained from switch) by a sum total of operator work volume (work statistic) and multiplying the result by 100 to obtain a percentage AWT parameter. A second example, relates to an individual operator, by using the total number of directory assistance calls handled by the operator divided by the operator's occupancy data to obtain a percentage occupancy value as an efficiency parameter.

The generated efficiency parameter, which is one of several such parameters, is then incorporated into a report (block 635) that is a printed report such as a tabular report, a graph, or a spreadsheet. The report can alternatively, be in the form of an electronic medium such as can be viewed on a display or transmitted electronically to another electronic device.

Drawing attention to FIG. 7 that is a flowchart describing a third embodiment among many, of using a number of work statistics and call statistics to generate the efficiency report of FIG. 3. It will be understood that several aspects of FIG. 7 can be understood by the explanation provided for FIG. 6. In block 705, work statistics from several sources are received in an efficiency report generator. One example among many, of such sources were described by the modules in FIG. 2. A second example comprises data provided manually and/or electronically by staff in the call centers and/or the WFMS staff. Entry codes may or may not be identical/similar between multiple sources. The explanation of blocks 710 through 725 will be understood by persons of ordinary skill in the art, by the explanation provided for blocks 610 through 625 of FIG. 6. Block 730 identifies a sorting step wherein the work efficiency parameters are catalogued per the convenience of a person viewing the efficiency report. For example, the efficiency parameters relating to a certain type of call, such as toll calls, are grouped together so that the results pertaining to these types of calls suitably examined.

Attention is now drawn to FIG. 8, which is a flowchart describing a fourth embodiment among many, of using work statistics to generate the efficiency report of FIG. 3. Once again, persons of ordinary skill in the art will recognize the details of the various steps of FIG. 8 in light of the explanation provided with reference to FIG. 6. Unlike in FIG. 6, in FIG. 8, one or more work statistics are used to produce an efficiency report. It will be noted that call statistics from the communication switch are not used in this flowchart. If an efficiency report providing an individual operator's performance is desired, steps 805, 810, 815, 820, 835, and 840 are carried out. In step 835, a first efficiency parameter is calculated by processing a work statistic of an operator. As one example of such a parameter, the work statistic comprises the operator's attendance record, and the efficiency parameter is the number of unpaid absence days the operator has taken over a certain duration of time. A second example comprises an efficiency parameter that provides the operator's average tour length. The average tour length is calculated from several work statistics such as duty hours, unpaid hours, compensatory hours, and over-time hours.

Alternatively, if one operator's performance is to be compared against, or is to be cumulatively combined with, a second operator, steps 805 through 830 followed by steps 840 and 845 are carried out. As one example of such a parameter, the work statistic comprises the attendance records of the two operators, and the efficiency parameter is a comparison of the number of unpaid absence days that the two operators have taken over a certain duration of time. A second example, comprises individual efficiency parameters that provide information relating to the average tour lengths of the two operators. A cumulative average of the two operators is then calculated to produce a efficiency report.

Alternatively, such efficiency parameters are calculated over not merely two, but a set of operators thereby obtaining an efficiency report relating to, for example, the overall average tour length of a set of operators in a call center.

The report generated by using FIG. 8 can be integrated into the report that is generated using FIG. 6.

It should be emphasized that the above-described embodiments of the present disclosure are merely possible examples of implementations and are set forth merely for providing a clear understanding of the principles of the disclosure. Many variations and modifications may be made to the above-described embodiment(s) of the disclosure without departing substantially from the spirit and principles of the disclosure. For example, it will be understood by persons of ordinary skill in the art, that several implementations upon several switches other than POTS switches may be carried out to implement this efficiency report generator. All such modifications and variations are intended to be included herein within the scope of this disclosure and the present disclosure and protected by the following claims.

I claim:

1. A method of generating an efficiency report, the method comprising:
   obtaining a set of switching statistics from a database of a communications switch;
   obtaining a set of work statistics of at least one operator in a call center;
   receiving an input statistic of the at least one operator in the call center from an input of a workforce management system; and
   generating, by a tangible processor of the workforce management system, an efficiency report by integrating the set of switching statistics, the set of work statistics, and the input statistic.

2. The method of claim 1, further comprising:
   generating a call-related quantity-parameter from the set of switching statistics;
   generating a call-related quality-parameter based on the set of work statistics and the input statistic of the at least one operator; and
   generating the efficiency report by integrating the call-related quantity-parameter with the call-related quality-parameter.

3. The method of claim 2,
   wherein the communications switch is a POTS switch located in a telephone central office, and wherein the set of switching statistics comprises telephone call statistics contained in the database of the POTS switch.

4. The method of claim 3,
   wherein the efficiency report includes at least one of work volume information, work time information, and work scheduling information.

5. The method of claim 1,
   wherein the communications switch is a packet switch in a data network, and wherein the set of switching statistics comprises switch usage information contained in the database of the communications switch.

6. The method of claim 5,
   wherein the efficiency report includes at least one of work volume information, work time information, and work scheduling information.

7. The method of claim 1,
   wherein the communications switch is a server of a client-server data network, and
   wherein the set of switching statistics comprises switch usage information contained in the database of the communications switch.

8. The method of claim 7,
   wherein the efficiency report includes at least one of work volume information, work time information, and work scheduling information.

9. The method of claim 1,
   wherein generating the efficiency report comprises translating a first entry code of a first database to a second entry code of a second database.

10. The method of claim 1,
    wherein generating the efficiency report comprises interpreting a first entry code of a first database and translating the interpreted result into a second entry code of a second database.

11. A system for generating an efficiency report, comprising:
    a non-transitory computer-readable medium for obtaining a set of switching statistics from a database of a communications switch;
    a non-transitory computer-readable medium for obtaining a set of work statistics of at least one operator in a call center;
    a non-transitory computer-readable medium for receiving an input statistic of the at least one operator in the call center from an input of a workforce management system; and
    a non-transitory computer-readable medium of the workforce management system that stores a set of instructions that, when executed by a tangible processor of the workforce management system generates an efficiency report by integrating the set of switching statistics, the set of work statistics, and the input statistic.

12. The system of claim 11, further comprising:
    a non-transitory computer-readable medium for generating a call-related quantity-parameter from the set of switching statistics;
    a non-transitory computer-readable medium for generating a call-related quality-parameter based on the set of work statistics and the input statistic of the at least one operator; and
    a non-transitory computer-readable medium for generating the efficiency report by integrating the call-related quantity-parameter with the call-related quality-parameter.

13. The system of claim 12,
    wherein the non-transitory computer-readable medium for obtaining the set of switching statistics from the database of the communications switch is for obtaining the set of switching statistics from the database of a POTS switch located in a telephone central office, and
    wherein the set of switching statistics comprises telephone call statistics contained in the database of the POTS switch.

14. The system of claim 13,
    wherein the efficiency report includes at least one of work volume information, work time information, and work scheduling information.

15. The system of claim 11,
    wherein the non-transitory computer-readable medium for obtaining the set of switching statistics from the database of the communications switch is for obtaining the set of switching statistics from the database of a packet switch in a data network, and
    wherein the set of switching statistics comprises switch usage information contained in the database of the packet switch.

16. The system of claim 15,
    wherein the efficiency report includes at least one of work volume information, work time information, and work scheduling information.

17. The system of claim 11,
    wherein the non-transitory computer-readable medium for obtaining the set of switching statistics from the database of the communications switch is for obtaining the set of switching statistics from the database of a server of a client-server data network, and
    wherein the set of switching statistics comprises switch usage information contained in the database of the server.

18. The system of claim 17,
wherein the efficiency report includes at least one of work volume information, work time information, and work scheduling information.

19. The system of claim 11,
wherein generating the efficiency report comprises translating a first entry code of a first database to a second entry code of a second database.

20. The system of claim 11,
wherein generating the efficiency report comprises interpreting a first entry code of a first database and translating the interpreted result into a second entry code of a second database.

\* \* \* \* \*